United States Patent
Schoen et al.

(10) Patent No.: US 6,702,885 B2
(45) Date of Patent: *Mar. 9, 2004

(54) PIGMENT PREPARATION AND ITS USE ESPECIALLY IN PRINTING INKS

(75) Inventors: Sabine Schoen, Darmstadt (DE); Reiner Vogt, Kranichstein (DE); Norbert Schül, Heppenheim (DE); Karl Osterried, Dieburg (DE); Gerhard Herget, Ober-Ramstadt (DE)

(73) Assignee: Merck Patent Gesellschaft Mit Beschrankter, Darmstadt (DE)

( * ) Notice: Subject to any disclaimer, the term of this patent is extended or adjusted under 35 U.S.C. 154(b) by 27 days.

This patent is subject to a terminal disclaimer.

(21) Appl. No.: 09/982,535

(22) Filed: Oct. 19, 2001

(65) Prior Publication Data

US 2002/0056399 A1 May 16, 2002

Related U.S. Application Data

(63) Continuation of application No. 09/322,164, filed on May 28, 1999, now abandoned.

(30) Foreign Application Priority Data

May 28, 1998 (DE) .......................................... 198 23 865

(51) Int. Cl.$^7$ .............................. C09D 11/00; C01C 1/00
(52) U.S. Cl. ...................... 106/31.9; 106/415; 106/417; 106/403; 106/481
(58) Field of Search .................................. 106/415, 417, 106/403, 404, 418, 481, 482, 489, 436, 464, 472, 443, 31.9

(56) References Cited

U.S. PATENT DOCUMENTS

| | | | |
|---|---|---|---|
| 5,324,354 A | | 6/1994 | Jesse et al. |
| 5,441,564 A | | 8/1995 | Vogt |
| 5,672,200 A | | 9/1997 | Heinz et al. |
| 6,267,810 B1 | * | 7/2001 | Pfaff et al. ................... 106/404 |
| 6,270,563 B1 | * | 8/2001 | Herget et al. ........... 106/169.41 |
| 6,294,010 B1 | * | 9/2001 | Pfaff et al. ................... 106/415 |
| 6,334,893 B1 | * | 1/2002 | Pfaff et al. ................... 106/442 |

* cited by examiner

Primary Examiner—Mark L. Bell
Assistant Examiner—Veronica F. Faison
(74) Attorney, Agent, or Firm—Millen, White, Zelano & Branigan, P.C.

(57) ABSTRACT

The present invention relates to a pigment preparation comprising a mixture of coated and/or uncoated $SiO_2$ flakes, one or more special-effect pigments, and a phosphate derivative, and to the use thereof, especially in printing inks.

24 Claims, No Drawings

PIGMENT PREPARATION AND ITS USE ESPECIALLY IN PRINTING INKS

SUMMARY OF THE INVENTION

The present invention relates to a pigment preparation comprising coated and/or uncoated $SiO_2$ flakes, one or more special-effect pigments and a phosphate compound and to its use, especially in printing inks.

Printing inks consist in general of binder, pigments or dyes and additives. In the case of printed products for printing packaging, labels and high-quality journals there is an ever-increasing requirement for luster to be given to the articles depicted.

Printing inks comprising luster pigments all have the disadvantage that they feature problems with print-run stability. They have a tendency to build up rapidly on the inking unit, printing plate and rubber cloth or else to sediment, so that a trouble-free print run or more than 10,000 sheets is generally not possible. A fundamental problem is the strong tendency of luster pigments, especially pearl luster pigments, owing to their plateletlike structure and the specific chemicophysical surface properties, to form agglomerates in the printing ink, the pigments lying atop one another in stacks and being difficult to separate owing to their strong adhesion. In addition, the luster imparted to such prints is generally unsatisfactory, owing to the inadequate amount of pigments transferred to the printed product. The ink becomes depleted in pigment on its path via inking unit, plate and rubber cloth. The pigment accumulates at exposed areas on the plate and cloth and leads to caking and piling.

In general, the only special-effect pigments which are suitable are those having a very small average particle size, since the particle size is critical for pigment transfer on printing. Pigments meeting this requirement exist only for pearly white and pastel shade colorations, but not for the gold, silver, bronze and copper tones which are of very great interest. To date, in the offset process, it has frequently proved impossible to produce such tones satisfactorily using special-effect pigments.

The use of platelet-shaped bismuth oxychloride pigments to obtain a pearl luster effect likewise does not lead to satisfactory results, since the pigment particles are highly sensitive to mechanical shear forces and are broken down in the ink nip.

The use of pearl luster pigments in printing inks for offset printing is known from DE 29 03 212, which discloses the pigmentation of a customary commercial oil-based print varnish with a preferably very finely divided pearl luster pigment. The offset print varnish preparation described therein is notable for the fact that the proportion of pearl luster pigments is very high, the upper limit of the pigment concentration in the suspension being set essentially only by the required flowability of the mixture. The proportion of pearl luster pigments in that case is in the range up to 65% by weight. Varnishes having such a high proportion of pigment are highly viscous and may need to be rendered more flowable with a diluent in order to be able to be processed in conventional offset printing machines. In contrast to the teaching to date, experiments in DE 29 03 212 have shown that the transfer of pigment from the inking unit to the substrate is disrupted at such high levels of pigmentation. There are print-run defects, such as piling and caking, meaning that the achievable pearl luster effect cannot be optimized solely by high pigmentation. Furthermore, the ink systems of DE 29 03 212 generally exhibit an inadequate dot definition, so that the ink systems described therein are restricted essentially to the printing of solid areas.

An object was therefore to find a pigment preparation, especially for printing inks, which achieves not only relatively high pigmentation of the printing ink but also satisfactory print-run properties.

It has surprisingly been found that the quality of the gloss effect and the amount of transferred pigment particles in a printing ink becomes optimum if use is made of a pigment preparation which comprises a mixture of uncoated $SiO_2$ flakes or $SiO_2$ flakes coated with one or more metal oxides, at least one special-effect pigment, and a phosphate compound.

The invention hence provides a pigment preparation comprising uncoated $SiO_2$ flakes or $SiO_2$ coated with one or more metal oxides, at least one special-effect pigment and a phosphate compound.

A component of the pigment preparation of the invention is the $SiO_2$ flakes, as described, for example, in WO 92/02351. $SiO_2$ flakes produced on a continuous belt in accordance with WO 93/08237 are based on a platelet-shaped, transparent, colored or colorless matrix and typically possess a thickness of about 0.1 to 5 $\mu$m, in particular about 0.2 o 2.0 $\mu$m. The length in the two other dimensions is typically about 1 to 250 $\mu$m, preferably about 2 to 100 $\mu$m and, more preferably, about 5 to 40 $\mu$m. The $SiO_2$ flakes may be covered with one or more metal layers and/or metal oxide layers. Examples of suitable metal oxides or metal oxide mixtures are, e.g., titanium dioxide, zirconium oxide, zinc oxide, iron oxides and/or chromium oxide, especially $TiO_2$ and/or $Fe_2O_3$. The matrix of the uncoated $SiO_2$ flakes may comprise a colorant; for example, a color-imparting metal oxide or an organic dye. The $SiO_2$ flakes can be coated, for example, as described in WO 93/08207 (wet chemical coating) or DE-A 196 14 637 (CVD process).

The outer metal oxide layer can also be a semitransparent layer of metal. Suitable metals for this are, for example, Cr, Ti, Mo, W, Al, Cu, Ag, Au and Ni. Preferred pigments have the following layer structure: $SiO_2$ flakes+metal+$SiO_2$+metal oxide.

To induce special color effects, fine particles in the nanometer size range can be incorporated additionally into the metal oxide layers of higher or lower refractive index. Examples of suitable candidates are, e.g., finely divided $TiO_2$ or finely divided carbon (carbon black) with particle sizes of about 10 to 250 nm. A controlled influence can be exerted on luster and hiding power by virtue of the light-scattering properties of such particles.

The special effect pigment can be, e.g., a metal effect pigment, interference pigment, luster pigment, goniochromatic pigment, pearlescent pigment, a pigment which exhibits a special color or color-flop, etc. By metal effect pigment is meant a pigment giving a metallic coloration and appearance. By interference pigment is meant a pigment giving an interference effect. The special-effect pigment is preferably a customary commercial metal-effect pigment, such as, e.g., platelet-shaped iron oxide, aluminum flakes, e.g., Stapa-Alupaste® or Standart® from Eckart, special-effect pigments, such as Paliochrom® from BASF, and pearl luster pigments—mica flake pigments coated with metal oxides—obtainable, for example, from Merck KGaA, Darmstadt, under the trade name Iriodin®. The latter are known, for example, from the German Patents and Patent Applications 14 67 468, 19 59 998, 20 09 566, 22 14 545, 22 15 191, 22 44 298, 23 13 331, 25 22 572, 31 37 808, 31 37 809, 31 51 343, 31 51 354, 31 51 355, 32 11 602 and 32 53 017. Pearl luster pigments are preferably used for the printing ink. In particular, $TiO_2$- and/or $Fe_2O_3$-coated mica pigments, glass flakes, ceramic flakes or synthetic platelets without a carrier are employed.

The pigment preparation can comprise a mixture of different special-effect pigments in order, for example, to achieve particular colorations. The ratio of $SiO_2$ flakes to special-effect pigment is about 10:1 to 1:10, preferably about 1:1 by weight.

In addition to the coated or uncoated $SiO_2$ flakes and the special-effect pigments, the pigment preparation of the invention may also include carbon black particles, flourescent pigments and/or organic color pigments, phyllosilicates, $TiO_2$, $CaCO_3$, $CaSO_4$ and/or kaolin. In that case the preparation preferably is about 30 to 100% by weight of $SiO_2$ flakes and special-effect pigments and about 0–70% by weight of carbon black particles, fluorescent pigments and/or color pigments.

A further component of the pigment preparation of the invention is a phosphate compound in about 0.1–10% by weight, preferably about 1–5% by weight. Suitable phosphate compounds are, for example, the higher and lower polyphosphates, or pyrophosphates. Particular preference is given to the alkali metal metapolyphosphates, especially sodium hexametapolyphosphate.

The pigment preparation is simple to prepare and easy to handle. In one embodiment, the pigment mixture is mixed with a phosphate compound which is either stirred in as a fine powder or added in the form of a suspension comprising the salt and a liquid component. Particularly suitable liquid components are mineral oils or other non-drying oils, such as, e.g., coconut oil, drying oils, such as soya oil or linseed oil, for example, and water or organic solvents or solvent mixtures. The liquid component preferably amounts to not more than about 30% by weight based on the pigment preparation. The pigment preparation can also be prepared by introducing all of the components simultaneously and then mixing them with one another without great shear forces. The finished pigment preparation can then be mixed into formulations such as printing inks, varnishes, paints, plastics and cosmetic formulations, for example.

In many cases it is advisable to stir a dispersant and/or redispersant into the pigment preparation. All dispersants known to the skilled worker can be used, as are described, for example, in Karsten, Lackrohstofftabellen, 9th edition 1992.

Particular suitable dispersants are those based on polyacrylates or polymethacrylates. The amount of dispersant employed should be not more than about 10% by weight, preferably about 0.1–5% by weight.

Examples of suitable redispersants are phyllosilicates, especially those from the smectite series, such as the montmorillonite/beidellite series. These smectites are particularly notable for their pronounced swelling behavior. In commerce, these products are marketed, for example, under the brand name Laponite, a synthetic sodium-magnesium-lithium silicate, which is similar to hectorite, by Laporte UK or by Südchemie, FRG under the names Optigel® CG, a bentonite, or Tixogel® PE, an organophilic hydrophobicized smectite. Also suitable are micaceous silicates of the vermiculite and the illite series, and micas themselves (muscovite, phlogopite, biotite). Redispersants are preferably platelet-shaped and capable of being digested during the spray-drying process. Mixtures of said phyllosilicates and modified phyllosilicates can be used. The phyllosilicates are preferably employed in an activated form; in other words, the silicates are dispersed in water, converted to a sol and then spray-dried.

The proportion of redispersant in the pigment preparation of the invention can be about 0.05 to 5% by weight, preferably about 0.1 to 2.5% by weight and, most preferably, about 0.2 to 1% by weight, based on the $SiO_2$/special-effect pigment content.

The pigment preparation of the invention is particularly suitable for pigmenting printing inks. Printing inks pigmented in this way can be used for all known printing techniques, especially for offset printing, relief printing, letterset, intaglio, flexographic and screen printing, and also for overprint varnishing and also for coatings. It is preferably used for offset printing. In this context it can be used either for web-fed offset printing or for sheet-fed offset printing by the dry or wet process; it is particularly suitable for wet-process sheet-fed offset printing.

The pigment preparation is dispersed in the printing ink or the binder by means of a stirrer mechanism with a propeller or paddle stirrer, employing different dispersing temperatures if desired, which can be routinely determined. The dispersing temperature is preferably about 5–50° C., most preferably about 10–30° C. In this process, the pigment particles become enveloped by the binder. The base inks thus obtained are subsequently made up to the finished product by adding the additives.

For the preparation of a pigmented offset printing ink, one can use all customary commercial binders. Such binders comprise known synthetic or natural resins, with or without drying oils, mineral oils, and additives, as are described, for example, in Karsten, Lackrohstofftabellen, 9th edition 1992. The resins that are used preferably possess a relatively low melt or solvent viscosity. However, highly polymerized and high-viscosity components may also be present. It has been found particularly appropriate to use combinations of hard resins and alkyd resins, since these provide better wetting of the luster pigments and give prints of greater gloss and rubfastness. The binders used are in particular those composed of about 50 to 90% by weight of hard resin and about 5 to 50% by weight of alkyd resin. The hard resins used are preferably hydrocarbon resins. The hydrocarbon resins employed may have an acid number close to about 0 mg of KOH/g of solids, or else they can be modified and have acid numbers of up to about 30 mg of KOH/g of solids. The binder can, in addition, contain about 1–50% by weight of a mineral oil. The ink components are matched to one another so as to achieve an ink/water balance which is stable and suitable for the low ink viscosity.

Preferably, a pigment formulation comprises a binder which is in the form of substantially solvent-free, free-flowing granules.

The printing ink is dried by oxidative polymerization of the resins and by means of oils, for example linseed oil, wood oil or castor oil, which pass into the paper in the course of printing. The drying operation can be accelerated further by additions of drying catalysts (siccatives), which are typically fatty acid salts of cobalt, lead, manganese, etc. The proportion of drying oils in the offset printing inks of the invention is about 0 to 50% by weight, preferably about 0 to 30% by weight. Further additives may be introduced into the printing ink in order to modify the ink properties for specific applications. These additives may be, e.g., wax compounds, drying agents, dispersants, solvents, thickeners, lubricants, pigment fillers and/or antioxidants. Further details regarding the fundamental characteristics of offset printing inks can be found, e.g., in A. Rosenberg, Der Polygraph (11), 1153 (1987) or B. Grande, Coating (4), 138 (1987).

Frequently, very low-viscosity pigment-containing printing inks do not provide adequate dot definition. It is this definition, however, which is preferable in fine screens in order to avoid clogging of the print. It is therefore advisable to provide the printing ink with structure. For instance, the addition of a structure former can bring about sufficient improvement in the dot definition. Preferably, the printing ink of the invention contains about 0.1 to 3% by weight of a structure former. In addition to the improved dot definition, a printing ink modified in this way displays markedly better pigment transfer and enhanced print-run properties.

Resins in the binders and the proportion of luster pigments in the printing ink can be routinely selected in order to adjust parameters which are important for the printing process, such as, e.g., dispersability, tackiness and viscosity. For a given ink composition, viscosity and tackiness are mutually dependent, but may also be modified individually in a controlled manner through a specific ink composition. In this context it should be noted that printing inks having too high a degree of tackiness may give rise to sections of the paper tearing (picking). Inks of inadequate tackiness are not transferred in an appropriate manner in the course of the printing operation. If the penetration of the ink is too great, it becomes visible on the opposite side of the paper or causes blotchiness or lack of clarity in the reproduced image. Poorly controlled penetration may give rise to smearing and deposits. By contrast, excessively viscous inks will not flow appropriately from the filling sources to the rollers. Commercially available printing inks are preferably formulated to viscosities of about 12 to 200 Pa.s. Printing inks comprising the pigment preparation of the invention can be formulated to viscosities <about 15 Pa.s, preferably <about 12 Pa.s and, most preferably, <about 10 Pa.s. This can be done without the printing ink exhibiting any problems in relation to spraying off from the inking rollers, even at printing speeds of about 10,000 sheets per hour or more.

Printing inks comprising the pigment preparation of the invention are particularly valuable for graphic products of the advertising sector and for high-quality printed products, since the gloss of the finished prints means that they meet the highest of aesthetic requirements.

The invention hence also provides printing inks which comprise up to about 40% by weight, especially about 10 to 30% by weight, of the pigment preparation of the invention.

The pigment preparation of the invention is likewise suitable as a precursor for a printing ink which comprises special-effect pigment.

The pigment preparation of the invention can be used for filling tubes and for extrusion. To produce dry preparations, the pigment preparation of the invention is extruded or compacted in granular form by methods known to the skilled worker, and if desired it is subsequently dried. The drying process generally takes place at temperatures of about 20 to 150° C., lasts for about 0.5 to 4 h and can be carried out, if desired, under reduced pressure. If desired, in a final operation the dry preparation can be comminuted. The resulting granules, which may contain up to about 95% pigments, are non-dusting and possess particle sizes of about 0.1 to 200 mm. The storage and transportation of the dry preparations are less restrictive and therefore highly unproblematic. The dry preparations possess the added advantage that they carry little or no liquid and can therefore be incorporated more readily into formulations.

The preparation of the invention, as a paste or as a dry preparation, can be used for diverse applications. It is preferably employed in coating systems from the print, paint and varnish sectors.

The pigment preparation of the invention is notable for its high luster and can therefore be employed for a very wide variety of purposes. In addition to its use in printing inks, it can be employed in plastics, paints and varnishes.

The invention also provides formulations which comprise the pigment preparation of the invention.

The examples which follow are intended to illustrate the invention without, however, limiting it.

In the foregoing and in the following examples, all temperatures are set forth uncorrected in degrees Celsius; and, unless otherwise indicated, all parts and percentages are by weight.

The entire disclosure of all applications, patents and publications, cited above and below, and of German application No. 198 23 865.7 filed May 28, 1998 is hereby incorporated by reference.

EXAMPLES

Example 1

200 g of Laponite RDS (product of Laporte, UK) are added with stirring at 500 rpm at 40° C. to 1800 g of deionized water and stirring is continued for 1 hour at 700 rpm. The result is a sol having a viscosity of 12 seconds (4 mm DIN cup).

The sol is dried in an Atomizer Minor spray drier from Niro having a theoretical throughput of 5–7 l/h at 95–100° C. and 4 bar.

A mixture of 100 g of Iriodin 123 Hellglanzsatin (bright luster satin) ($TiO_2$/mica pigment of particle size 5–25 $\mu$m from Merck KGaA, FRG) and 150 g of $TiO_2$-coated $SiO_2$ flakes with particle size 5–40 $\mu$m are dry-mixed with 3.8 g of spray-dried Laponite RDS. The mixing time is 15 minutes. This produces a homogeneous material.

39 g of this homogeneous material are incorporated into 91 g of a binder, Synthacryl SW175 (40% strength solution of acrylic resin in $H_2O$/isopropanol 2:1) from Hoechst and the batch is adjusted with isopropanol to an outflow time of 21+/− 1 seconds. The pigment content is 22.3% by weight.

The viscosity is measured in accordance with DIN 53211. The pearl luster ink settles out only as a fairly loose sediment which can easily be reagitated when required.

Printing with this ink gives highly lustrous prints with a very uniform expression.

Example 2

700 g of sheetfed offset binder (Gebra. Schmidt Bronzefirnis [bronze varnish] 11A10342; viscosity, measured using Laray falling-rod viscometer: about 24±2 Pa.s) are charged to a stirred vessel with paddle stirrer. 320 g of the pigment preparation from Example 1 are added with slow stirring. During this addition the mixture warms to about 40° C. When the constituents are homogeneously distributed, the ink is given an airtight seal. After storage for 24 h the viscosity and tack of the ink are measured:

$eta^*=20\pm4$ Pa.s(20° C.)

$tack^{**}:120\pm10$(30° C.)

\* Viscosity measurement with a Laray falling-rod viscometer (Lhomargy S.A.) in analogy to DIN 53222. Weights used: 800, 600, 400, 200 g.
\*\* Tack measurement using Tack-o-scope (from Testprint B.V.); roller speed 100 m/min.

Depending on the printing conditions, the ink is adjusted to a viscosity of 10 Pa.s with further Drucköl L [printing oil] from BASF.

Printing on a Roland 200 sheetfed offset machine gives flawless pigment transfer and prints with an excellent pearl luster effect.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A pigment preparation comprising $SiO_2$ flakes, coated with $TiO_2$, at least one special-effect pigment and a phosphate compound.

2. The pigment preparation according to claim 1, wherein said $SiO_2$ flakes have a particular size of 5 to 40 μm.

3. The pigment preparation according to claim 1, wherein said special-effect pigment is a pearl luster pigment or coated or uncoated iron oxide and/or aluminum flakes.

4. The pigment preparation according to claim 1, wherein said special-effect pigment is a pearl luster pigment.

5. The pigment preparation according to claim 1, wherein said special-effect pigment is a metal effect pigment or an interference pigment.

6. The pigment preparation according to claim 1, wherein said special-effect pigment is mica pigments, glass flakes Or ceramic flakes coated with $TiO_2$ and/or $Fe_2O_3$, or synthetic platelets without a carrier.

7. The pigment preparation according to claim 1, wherein the ratio of said $SiO_2$ flakes to said special effect pigment is 1:1 by weight.

8. The pigment preparation according to claim 1, wherein said phosphate compound is 0.1–10% by weight.

9. The pigment preparation according to claim 8, wherein said phosphate compound is 1% to 5% by weight.

10. The pigment preparation according to claim 8, wherein said phosphate compound is a polyphosphate or a pyrophosphate.

11. The pigment preparation according to claim 1, wherein said phosphate compound is an alkali metal metapolyphosphate.

12. The pigment preparation according to claim 11, wherein said phosphate compound is sodium hexametapolyphosphate.

13. The composition according to claim 1, further comprising pigment carbon black particles, a fluorescent pigment, an organic color pigment, a phyllosilicate, $TiO_2$, $CaCO_3$, $CaSO_4$, or kaolin.

14. The composition according to claim 13, wherein the combined weight of said $SiO_2$ flakes and special-effect pigments is 30 to 100% by weight, and the weight of said carbon black particles, fluorescent pigment and/or color pigment is 0 to 70% by weight.

15. The pigment preparation according to claim 1, further comprising a polyacrylate or polymethacrylate dispersant, which is 0.1 to 5% by weight.

16. The pigment preparation according to claim 1, further comprising a platelet-shaped redispersant, which is 0.2 to 1% by weight, based on the $SiO_2$ special-effect pigment content.

17. The pigment preparation according to claim 1, further comprising not more than 20% by weight of a liquid component.

18. A printing ink, varnish, paint, plastic or a precursor for a printing ink, comprising the pigment of claim 1.

19. An offset printing ink comprising up to 50% by weight of the pigment preparation according to claim 1.

20. The printing ink according to claim 18, further comprising a binder which is 50–90% by weight of a hard resin and 5–50% by weight of an alkyd resin.

21. A formulation comprising the pigment preparation according to claim 1.

22. A pigment formulation comprising a pigment preparation according to claim 1 and a binder which is in the form of substantially solvent-free, free-flowing granules.

23. A pigment preparation comprising $SiO_2$ flakes, coated with $TiO_2$, at least one special effect pigment and a phosphate compound and wherein said pigment preparation yields a pearl luster-effect and a color flop on pre-printed paper or board products.

24. A highly lustrous print with a visible color flop on a pre-printed paper or board substrate prepared with a pigment preparation according to claim 1.

* * * * *

UNITED STATES PATENT AND TRADEMARK OFFICE
CERTIFICATE OF CORRECTION

PATENT NO.     : 6,702,885 B2
DATED          : March 9, 2004
INVENTOR(S)    : Sabine Schoen et al.

It is certified that error appears in the above-identified patent and that said Letters Patent is hereby corrected as shown below:

<u>Title page</u>,
Item [73], Assignee, reads "Beschrankter," should read -- Beschränkter Haftung, --

<u>Column 7</u>,
Line 31, change "Or" to -- or --.

Signed and Sealed this

Fourth Day of January, 2005

JON W. DUDAS
*Director of the United States Patent and Trademark Office*